Aug. 9, 1960     I. N. MERRILL     2,948,504
DIAPHRAGM VALVES
Filed Nov. 29, 1955     3 Sheets-Sheet 1

INVENTOR
IAN NUTTALL MERRILL
BY
ATTORNEY.

Aug. 9, 1960 I. N. MERRILL 2,948,504
DIAPHRAGM VALVES
Filed Nov. 29, 1955 3 Sheets-Sheet 2

Inventor
Ian Nuttall Merrill
By Ernest Montague
Attorney

Aug. 9, 1960  I. N. MERRILL  2,948,504
DIAPHRAGM VALVES

Filed Nov. 29, 1955  3 Sheets-Sheet 3

*Inventor*
Ian Mittall Merrill
By *(signature)*
*Attorney* the tube in which it turns, and which it consequently fully supports. When the rotor is turned the flexible tube in effect flows over it, changing contour with the surface of the rotor as it does so.

Turning the lobe section of the rotor into a vertical position has the effect of pushing the material of the flexible tube against the transverse periphery of the inside of the valve body to an extent determined by the dimensions of the body at this point. This closes the valve and stops flow in a manner calculated to give the minimum wear, the flexible material of the tube being literally rolled into cushioned contact with the valve body. Conversely, turning the lobe section of the rotor into a horizontal plane has the effect of moving the flexible tube away from the top and bottom of the valve body, and allowing streamlined flow above and below the flattened tube.

With these and other objects in view which will become apparent in the following detailed description, the present invention will be clearly understood in connection with the accompanying drawings, in which:

Fig. 3a is a section along the lines 3a—3a of Fig. 2a.

Figure 1:
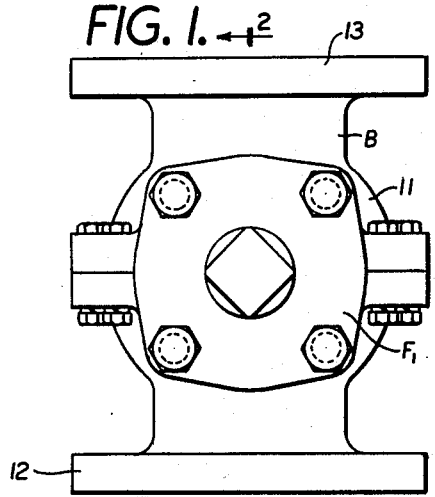
Figure 1 is a side elevation of a valve body.
Figure 1A:
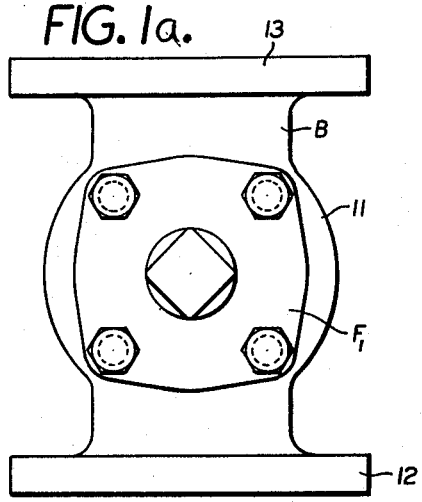
Fig. 1a is a side elevation of an alternative form of a valve body.
Figure 2:
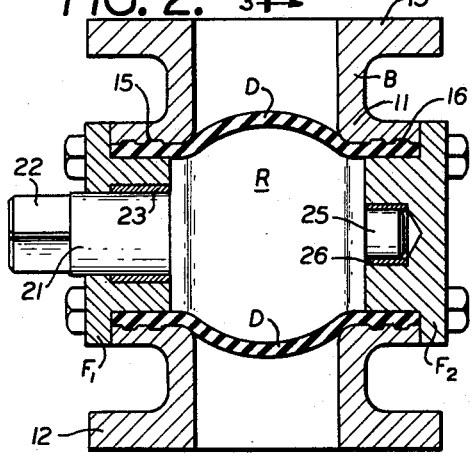
Fig. 2 is a section along the lines 2—2 of Fig. 1.
Figure 2A:
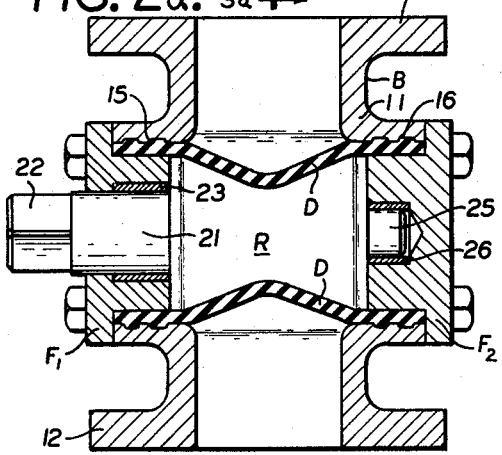
Fig. 2a is a section similar to that shown in Fig. 2, yet the diaphragm closure member being in a different position.
Figure 3:
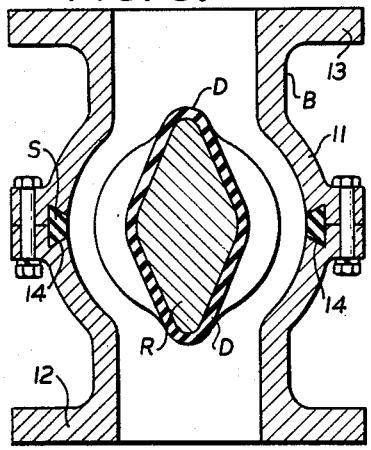
Fig. 3 is a section along the lines 3—3 of Fig. 2.
Figure 3A:
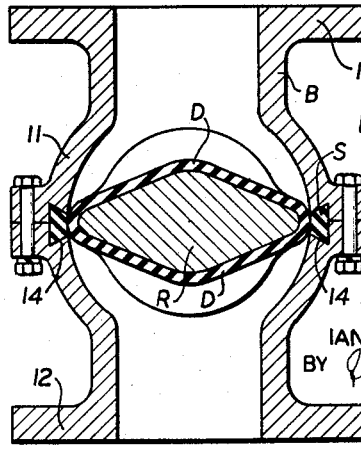

Referring now to the drawings, and in particular to Figs. 1, 1a and 3, 3a, a valve body B may be made in one piece (Fig. 1a) or may be of split construction bolted together (Figs. 1, 3 and 3a). In either case it comprises a generally spherical central portion 11 with flanged inlet and outlet connections 12 and 13, respectively.

The split type of body enables a renewable valve seating ring S to be moulded in a dovetail section groove 14.

The diaphragm closure member D is constituted by a flexible tube, and has its opposite ends anchored in coaxial bores 15 and 16 in the body by flanged interference metal sleeves $F_1$ and $F_2$. Each of the bores 15 and 16 has two cannelures or circumferentially extending grooves into which the material of the diaphragm is expanded for the better sealing effect.

A rotor R has an operating spindle 21 terminating in a square head 22 and journalled in a bushing 23 in the flanged sleeve $F_1$ and a smaller bearing spindle 25 journalled in a bushing 26 in the flanged sleeve $F_2$.

Where the body is of unitary construction the rotor must necessarily be built up from more than one piece, in order to assemble the valve.

Instead of using flanged metal sleeves the diaphragm may be formed with integrally moulded flanged end portions.

Figure 4:
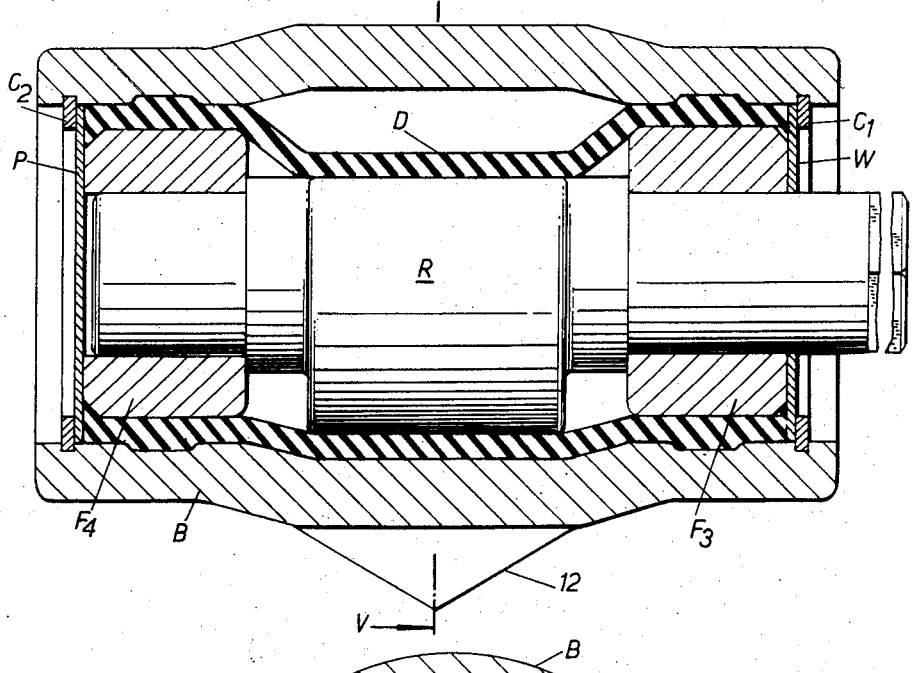
Fig. 4 is a longitudinal section, partly in elevation showing another form of valve construction in accordance with the invention.
Figure 5:
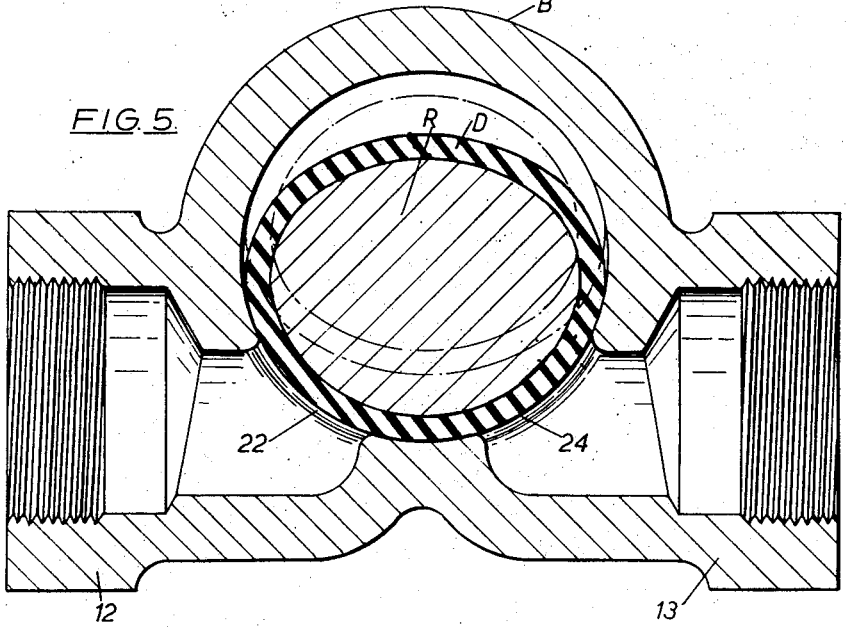
Fig. 5 is a section on the line V—V of Fig. 4.

In the valve of Figs. 4 and 5 the rotor R is offset from the axis of the inlet and outlet connections 12, 13 of the body B. In this case a double seating of the diaphragm closure member D occurs in the closed condition of the rotor, with respect to an inlet port 22 on the side of the inlet connection, and with respect to an outlet port 24 on the outlet side.

The rotor R is rotatably mounted in fittings $F_3$ and $F_4$ which are located within the body B by a washer W and

United States Patent Office 2,948,504
Patented Aug. 9, 1960

2,948,504

DIAPHRAGM VALVES

Ian Nuttall Merrill, Clarendon House, Brincliffe, Sheffield, England

Filed Nov. 29, 1955, Ser. No. 549,812

1 Claim. (Cl. 251—258)

The present invention concerns diaphragm valves for controlling and effecting, respectively, the flow of gases, liquids, and/or solids, in pipe lines.

One object of the present invention is to provide a valve having a diaphragm of simple and robust shape which in operation is substantially free from stretching and straining and which avoids the use of mechanical attachments such as would cause local stresses.

Another object of the present invention is to reduce the wear on the contacting parts of a diaphragm valve and to ensure that the closure force has a predetermined fixed limit which prevents the possibility of damage due to application of excessive manual pressure.

Further objects include the provision of a valve the body of which is of simple shape and smooth contours suitable for being lined with resistant material such as rubber, lead, glass, or plastics; to avoid pockets which might collect liquids or solids and to permit of easy draining, flushing and sterilizing; and to enable a substantially unrestricted and streamline flow to obtain through the valve with extremely low pressure drop across it.

According to the present invention the displaceable member of a diaphragm valve includes at least one flexible tube, non-rotatably mounted and deformable for valve operation by a rotary cam (hereinafter called a "rotor") disposed within it.

In a diaphragm valve the closure member constituted by a flexible tube is preferably secured in both end regions against rotation relative to the valve body, but presents an intermediate free region deformable by the rotor into appropriate shapes for open and closed positions of the valve.

The body of the valve preferably has an approximately spherical shape with smooth contours towards the inlet and outlet connections, which may be in the form of flanges or conventional valve and pipe line connections, e.g. conical flanges, spigot and socket, screwing, etc. Diametrically opposite openings across the axis of the valve body between the end connections, provide location for a substantial tubular diaphragm of flexible material, such as natural or synthetic rubber. For instance chemical rubber, butyl rubber, neoprene rubber, hypalon, or other suitable material. Polyvinyl chloride may be used. Metal sleeves pressed inside the open ends of the flexible tube, by interference are preferably used to seal the tub into the valve body.

The rotor which is preferably of a shape having diametrically opposite tapering lobes, is located inside the free central section of the flexible tube and is turned by a spindle or shaft located in the bushed metal sleeves which fix the tube diaphragm ends. The rotor, which preferably works in a bath of suitable lubricant, such as castor base hydraulic fluid, has cylindrical ends and tapers towards an oval or double lobe section at the centre. It is made to have a superficial peripheral area slightly less than the inside surface area of the flexible an end plate P, respectively, bearing on spring circlips $C_1$ and $C_2$.

Obviously with such a construction, by providing a connection to the central portion of the body a two-way diaphragm valve can be made. Similarly multi-way valve constructions are possible by providing more than two seatings.

Figure 6:
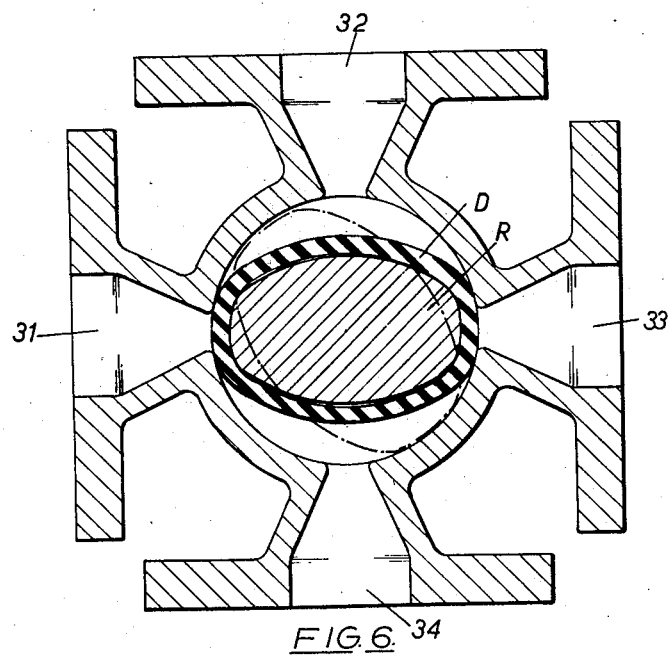
Fig. 6 is a view in section similar to that of Fig. 5 showing the structure of a multi-way diaphragm valve.

In the valve shown in Fig. 6 the rotor R can position the diaphragm D as shown in full lines whereby no communication obtains between any of the four connections 31, 32, 33 and 34. In an intermediate position of the rotor the diaphragm is disposed as indicated in chain-dotted lines, thus providing communication between connections 31 and 34 and between connections 32 and 33. In a diaphragm position at right angles to that shown in chain-dotted lines communication obtains between connections 31 and 32 and between connections 33 and 34. Thus a double-two-way or multi-way valve is provided.

While I have disclosed several embodiments of the present invention, it is to be understood that these embodiments are given by example only and not in a limiting sense, the scope of the present invention being determined by the objects and the claim.

I claim:

A diaphragm valve comprising a valve body, having inlet and outlet apertures with a flow passage therebetween, said valve body having diametrically opposite bores transverse to the longitudinal axis of said flow passage, a closure member, metal sleeves, spring washers and a rotor, said inlet and outlet apertures being on opposite sides of said valve body, and said closure member comprising, a flexible tube of substantially uniform cross-sectional area throughout its length and said diametrically opposed bores having circumferentially extending grooves, said metal sleeves being pressed into the ends of said flexible tube to hold said flexible tube against rotation relative to said valve body so that said flexible tube expands into said circumferentially extending grooves, said spring washers being fitted into said bores to retain said metal sleeves with said valve body, said rotor having bearing means in said metal sleeves and being encased by said flexible tube, and said rotor having cylindrical ends sloping towards a lobe section near the mid-region thereof deforming an intermediate portion of said flexible tube, said lobe section being eccentric relative to said cylindrical ends, rotation of said rotor relative to said valve body and said flexible tube causing said flexible tube to be moved into or out of the flow passage through said valve, and said rotor working within an oil bath within said flexible sleeve.

References Cited in the file of this patent

UNITED STATES PATENTS

| | | |
|---|---|---|
| 2,381,544 | Jacobsen | Aug. 7, 1945 |
| 2,397,373 | Saunders | Mar. 26, 1946 |
| 2,519,642 | Ford | Aug. 22, 1950 |
| 2,534,577 | Courtot | Dec. 19, 1950 |
| 2,583,572 | Huber | Jan. 29, 1952 |
| 2,620,815 | Margraf | Dec. 9, 1952 |
| 2,784,934 | Paulius | Mar. 12, 1957 |
| 2,812,154 | Nordstrand | Nov. 5, 1957 |

FOREIGN PATENTS

| | | |
|---|---|---|
| 623,696 | Great Britain | May 20, 1949 |
| 1,023,320 | France | of 1952 |
| 143,999 | Sweden | of 1954 |